March 10, 1953 G. M. MAST ET AL 2,630,642
SLIDE VIEWER
Filed May 6, 1947

INVENTOR.
G. M. MAST
W. K. GANNETT
BY
Merrill M. Blackburn

Patented Mar. 10, 1953

2,630,642

UNITED STATES PATENT OFFICE 2,630,642

SLIDE VIEWER

Gifford M. Mast and Wright K. Gannett, Davenport, Iowa, assignors to Mast Development Company, Inc., Davenport, Iowa, a corporation of Iowa Application May 6, 1947, Serial No. 746,392

9 Claims. (Cl. 40—125)

Our present invention relates to apparatus for viewing transparent slides and comprises among its objects the provision of an apparatus of the type indicated which can be molded in a single piece, instead of two or four, as has heretofore been done; the provision of an apparatus which is just as efficient as prior constructions designed for the same purpose but which can be manufactured at a lower cost; and such further objects, advantages, and capabilities as will hereafter appear and as are inherent in the construction disclosed herein. Our invention further resides in the combination, construction, and arrangement of parts illustrated in the accompanying drawings and, while we have shown therein what is now regarded as the preferred embodiment of this invention, we desire the same to be understood as illustrative only not to be interpreted in a limiting sense.

In the drawings annexed hereto and forming a part hereof,

Figure 3:
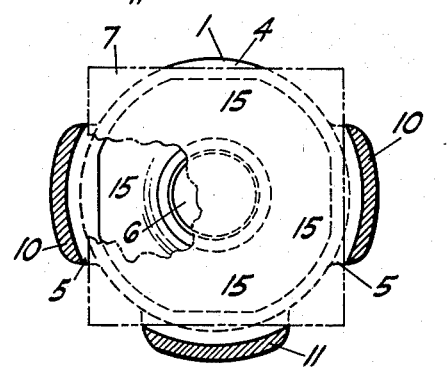
Fig. 3 represents a transverse section substantially along the plane indicated by the line 3—3, Fig. 2.

Reference will now be made in greater detail to the annexed drawings for a more complete description of this invention. This viewer comprises a housing, backbone, casing or shell 1, a translucent window 2, and a lens 6, the housing or shell being preferably molded from plastic and having an opening 3 in which the lens 6 is mounted and through which the slide is viewed. In its upper portion, the shell has a slot 4 for the reception of the transparent slide which is dropped into place. As shown in Fig. 3, the shell has a pair of openings 5 for the reception of the lower corners of the slide, indicated at 7. The protruding lower corners of the slide or transparency 7, extending through the openings 5, make it possible to push the transparency up to a position where it will be easy to grasp an upper corner and withdraw the slide from the viewer. Since the upper corners protrude somewhat, even when the slide is entirely down, it will be possible to do this, although not with equal facility.

Figure 1:
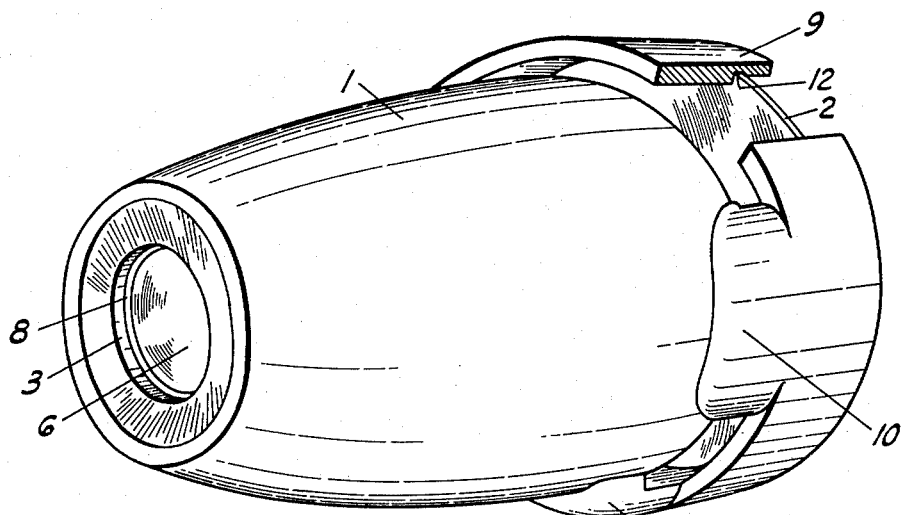
Fig. 1 is a perspective view of our invention, shown as partly broken away.
Figure 2:
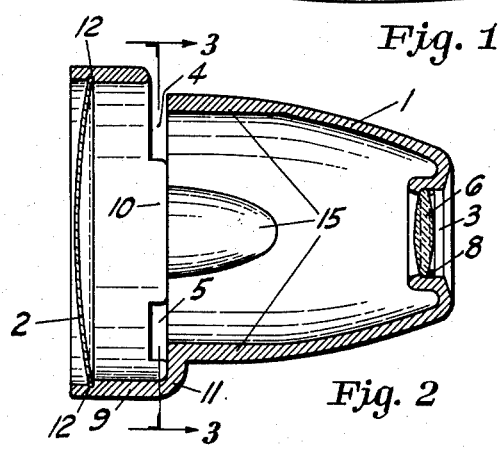
Fig. 2 represents a central, vertical, longitudinal section of the structure shown in Fig. 1, the structure being preferably symmetrical with relation to the plane of this section.
Figure 4:
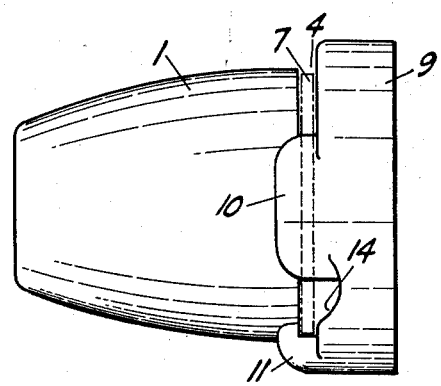
Fig. 4 is a side elevation of this structure showing an optional form of the two side slots.

The forward portion 9 of the viewer is held to the body of the shell by means of bridges 10 and 11, as shown most clearly in Figs. 2 and 4. As shown in Fig. 2, the upper slot 4 is of the same width as the lower slots 5 but, since slides vary in thickness, it is necessary to have these openings 4 and 5 wider than is essential for the thinnest of the slides. Therefore, as will be apparent, the lower corners of the slides could be tipped forward and rest on the inside of the extension or forward portion 9. In order to avoid this, which would result in the slide being out of position in the viewer, notches or cams 14, as shown in Fig. 4, are formed in the forwardly extending ring 9. These do not permit the corners of the slide to rest on the inside of the wall but cause it to move backwardly and drop down into the position shown in Fig. 3.

When it is desired to apply the translucent window 2 to the forward extension 9, this can be done by applying a suction apparatus to the disc of which the window is formed, and this will cause an outward bending of the translucent sheet, resulting in a slight decrease in the diameter thereof so that it can be put into place in the groove 12. Then, when the suction is released from the translucent sheet, this springs out into the groove and it is held tightly in place. Preferably the groove 12 is formed by a small undercut of a few thousandths of an inch. After expanding into place, there is still a residual belly in the window, insuring a tight fit in the groove. Furthermore, since the entire surface is flexed, the translucent window or diffuser 2 appears to be very smooth, in contrast to the ripply appearance of a flat, unflexed sheet. In fact, the diffuser 2 appears like a large glass lens with a convex forward surface.

As shown in Fig. 2, a lens 6 is inserted in the viewing end of the viewer, preferably from the outside, to permit easy removal for cleaning. The lens 6 has such a focal length as to produce a virtual image at a distance of at least several feet to as much as infinity and is inserted in the opening 3, preferably being held in place therein by a spring-ring 8. The emergent light is either slightly divergent or collimated for easy eye-accommodation.

The bridges 10 and 11, shown in Figs. 2 and 3, connect the shell or casing 1 and the forward extension 9. As mentioned above, these tend to locate the slide 7 laterally and vertically. They, taken in connection with the gradually tapering form of the housing, make possible the molding of this casing in one piece. The groove 12 might appear to militate against this operation but this groove is only a few thousandths of an inch deep and the flexibility and distensibility of the material of which the viewer casing is formed permits it to be snapped over the rib 13 which is utilized for the formation of the groove, this rib extending outwardly from the body of the male part 18 of the mold.

As shown in Figs. 2 and 3, there are inward extensions or projections 15 from the roughly cylindrical shape of the casing, the inner faces of these projections 15 being flat, or substantially so. Without reducing the visible portion of the slide, these projections substantially prevent any leakage of light past the edges of the slides. They permit use of a tubular member 1 having a greater diameter, both internally and externally, thus making possible use of longer bridges 10 and 11 and strengthening of the apparatus. The greater outside diameter of the forward portion 9, as shown in Figs. 2 and 4, permits the bridges 10 and 11 to be of a maximum length without encroaching upon the area to be occupied by the transparency 7. Maximum length of the bridges is desirable for strength and to permit easy flow of material between the two parts of the mold when molding the casing.

Figure 5:
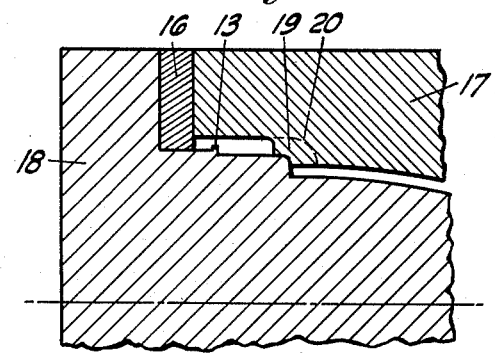
Fig. 5 represents a fragmentary, central section of the male and female parts of a mold for manufacturing the housing of this viewer.

Fig. 5 shows a fragmentary central section of the mold used in either compression molding or injection molding of the plastic housing. The mold consists of a male part 18 acting as a core and a female part 17 forming the outside of the housing or casing. An intermediate piece 16 serves as a stripper for removing the shell from the male part of the mold. Parts 17 and 18 overlap at 19 to form the slots 4 and 5 which receive the transparency 7. Portions of the female part 17 are cut out, as indicated by the dotted line 20 in Fig. 5, so that the bridges 10 and 11 will be formed and will connect the main body of the casing 1 and the forward projection 9. If the parts 17 and 18 of the mold do not fit closely at the points where the slots 4 and 5 are to be formed, there may be in the molded casing thin fins or "flashes" which may be easily removed to complete the openings.

As pointed out above, the part 18 may be provided with a circumferential rib 13 for the formation of the groove 12 around the inside of the ring 9. If the notches 14 are to be formed in the ring 9, this must be accomplished by means of a more complicated mold, such as one in which the female part has forwardly extending projections for the making of the notches. These may either be inserts or they may constitute an integral portion of the mold part 17. Probably the machining of the parts, in the preparation of the mold, could be done better if separate inserts were used for the making of these notches 14. While we have disclosed the groove 12 as being formed in the inner surface of the ring 9, we wish it understood that we do not regard this as essential since the translucent sheet will hold itself in place without this, if properly shaped and inserted. While we have referred above to member 2 as a disc, we wish it definitely understood that it is not necessary that the window 2 be circular in outline since this may have other shapes, as, for example, rectangular or parallel-sided with the corners rounded. Therefore, the word "disc" is to be interpreted with this thought in mind.

It is of course understood that the specific description of structure set forth above may be departed from without departing from the spirit of this invention as disclosed in this specification and as defined in the appended claims.

Having now described our invention, we claim:

1. In a slide viewer, a shell having an objective end and an eyepiece end, said shell having both ends open, a viewing lens mounted in the opening in the eyepiece end, and a forward extension at the objective end of the shell, said extension being substantially cylindrical with an internal diameter greater than the external diameter of the objective end of said shell and in axial alignment with said shell and spaced axially from the latter, said cylindrical extension being connected to the shell by circumferentially spaced apart bridges, said bridges having portions forming slide-receiving shoulders joined to said cylindrical extension and substantially radially inwardly extending portions joined to the objective end of the shell.

2. A viewer for the purpose stated comprising a shell tapering from its objective end toward its eyepiece end, and a forward extension at its objective end connected thereto by three circumferentially spaced bridges, the upper part of the extension being separated from the objective end by a slot having dimensions sufficient to permit a slide to be viewed to be inserted and removed from the slot, two of said bridges being positioned in diametrically opposed relation at opposite ends of said slot and having substantially radially inwardly facing slide-receiving shoulders adapted to receive and position opposite sides of said slide, the third bridge being positioned substantially midway between said two bridges at the lower part of the viewer having an upwardly facing slide-receiving shoulder adapted to receive the lower edge of said slide with the lower corners of the slide extending outwardly of the viewer in the spaces between said lower bridge and said two bridges, the wall of said extension immediately forward of said last mentioned spaces being angled downwardly and rearwardly and cooperating with the lower corners of said slide to guide the latter into proper viewing position.

3. A picture viewer comprising a unitarily moldable tapering shell and a forward extension thereof, the shell and extension being of larger internal diameter than the external diameter of the shell, the extension and shell being connected and held spaced apart by two circumferentially spaced bridges, each comprising a projection extending rearwardly from the extension and inwardly to the outer periphery of the shell, said bridges being arranged in spaced apart relation to receive a picture slide therebetween, the said rearward projections thereof serving as lateral guides for the slide, and forward stopping means for slides inserted into the space between the guides, shell, and extension, and the said extension having cams in its rearward portion below said bridges and facing the forward end of the shell to guide the leading edge of the slide to a position substantially in contact with the forward edge of the shell.

4. In a slide viewer, a shell having an eyepiece end and an objective end, there being a slide-receiving slot at the upper side of the shell extending substantially the entire diameter of the shell adjacent the objective end of the latter, and a pair of lower circumferentially spaced apart slots below said first slot and adapted to receive the lower corners of said slide, one wall of each of said lower slots being at an acute angle relative to the plane of said slots and adapted to engage the lower edge of the slide for guiding the latter into position in said slots.

5. In a slide viewer, a shell having an eyepiece end and an objective end, the latter being approximately circular in cross-section, there being a slide-receiving slot at the upper side of the shell extending substantially the entire diameter of the shell adjacent the objective end of the latter, a pair of lower circumferentially spaced-apart slots below said first slot adapted to receive the lower corners of the slide, a pair of diametrically opposed slide-engaging guides carried by the outer portions of the shell at the ends of said first slot and above said lower slots for guiding and positioning a slide in said slots, and a pair of radially inwardly extending projections on the interior of the shell at the objective end thereof and adjacent said outer guides to prevent leakage of light past the edges of the slide.

6. In a slide viewer, a shell having an eyepiece end and an objective end, the latter lying in a plane substantially normal to the longitudinal axis of said shell, an extension joined to the objective end of said shell, there being a slide-receiving slot at the upper side of the shell between the main portion of the extension and the objective end of said shell, said slot extending substantially the entire diameter of the shell adjacent the objective end of the latter, and a pair of lower circumferentially spaced-apart slots below said first mentioned slot and adapted to receive the lower corners of the slide, said lower slots being formed principally in said extension, the forward wall of each of said latter slots lying at an angle to and forward of the objective end of said shell, said angled walls extending downwardly and inwardly toward but spaced from the plane of the objective end of said shell so as to engage the lower edge of the slide for guiding the same into position substantially against the objective end of said shell.

7. A slide viewer comprising two substantially cylindrical members arranged coaxially, one having a diameter larger than the other, approximately L-shaped bridges spaced apart circumferentially of said members and connecting said members together with their adjacent ends spaced apart to receive a slide to be viewed, each of said L-shaped bridges including a portion extending radially inwardly for connection to the member of smaller diameter, and a portion extending axially and connected with the member of larger diameter, the latter portion of each bridge having slide receiving and positioning means.

8. A slide viewer as defined by claim 7, further characterized by the portions of said bridges that are connected with said larger diameter member being curved in circumferential coextension therewith.

9. A slide viewer as defined by claim 7, further characterized by two of said bridges being spaced apart diametrically of said members, the smaller diameter member having substantially flat radially inwardly facing projections lying adjacent said diametrically spaced-apart bridges to prevent light leakage at these points.

GIFFORD M. MAST.
WRIGHT K. GANNETT.

REFERENCES CITED

The following references are of record in the file of this patent:

UNITED STATES PATENTS

| Number | Name | Date |
|---|---|---|
| Re. 19,000 | Scrilner | Nov. 14, 1933 |
| 717,604 | Oelkers | Jan. 6, 1903 |
| 1,076,681 | Levine | Oct. 28, 1913 |
| 1,291,710 | Arter | Jan. 21, 1919 |
| 1,463,624 | Mabee | July 31, 1923 |
| 1,487,173 | Manion | Mar. 18, 1924 |
| 1,504,989 | Spitzer | Aug. 12, 1924 |
| 1,808,176 | Pieper et al. | June 2, 1931 |
| 2,010,551 | McCenalogue | Aug. 5, 1933 |